US006560598B2

(12) United States Patent
Delo et al.

(10) Patent No.: US 6,560,598 B2
(45) Date of Patent: *May 6, 2003

(54) INTERNAL DATABASE VALIDATION

(75) Inventors: John C. Delo, Bellevue, WA (US); Carolyn L. Napier, Blacksburg, VA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/978,446

(22) Filed: Oct. 16, 2001

(65) Prior Publication Data

US 2002/0059187 A1 May 16, 2002

Related U.S. Application Data

(63) Continuation of application No. 09/157,828, filed on Sep. 21, 1998.

(51) Int. Cl.[7] .................................................. G06F 7/00
(52) U.S. Cl. .................................................. 707/4; 707/2
(58) Field of Search ...................... 707/1, 10, 4, 100, 707/200

(56) References Cited

U.S. PATENT DOCUMENTS

| | | | | |
|---|---|---|---|---|
| 5,133,068 A | | 7/1992 | Crus et al. | 707/100 |
| 5,475,812 A | | 12/1995 | Corona et al. | 345/807 |
| 5,745,896 A | | 4/1998 | Vijaykumar | 707/100 |
| 5,752,018 A | | 5/1998 | Sheffield | 707/2 |
| 5,758,144 A | | 5/1998 | Eberhard et al. | 707/2 |
| 5,805,796 A | * | 9/1998 | Finch et al. | 710/17 |
| 5,873,079 A | | 2/1999 | Davis, III et al. | 707/3 |
| 5,889,934 A | | 3/1999 | Peterson | 714/6 |
| 5,960,430 A | | 9/1999 | Haimowitz et al. | 707/6 |
| 6,026,410 A | | 2/2000 | Allen et al. | 707/104.1 |
| 6,032,132 A | | 2/2000 | Nelson | 705/34 |
| 6,032,151 A | * | 2/2000 | Arnold et al. | 707/102 |
| 6,111,614 A | | 8/2000 | Mugura et al. | 348/569 |
| 6,128,294 A | | 10/2000 | Oura et al. | 370/389 |
| 6,389,414 B1 | * | 5/2002 | Delo et al. | 707/4 |

OTHER PUBLICATIONS

Kelly, M. "Gain Control of Application Setup and Maintenance with the New Windows Installer," *Microsoft Systems Journal*, Sep. 1998, pp. 15–27.
Larsson, J., et al., "The Installer Interface," http://officeweb/specs/TCO/InstallerInterface.html, Jul. 20, 1998, pp. 1–60.
White, L., et al., "Making Setup Make Sense" (Darwin), Whitepaper (In Progress), http://tcoweb/darswin/overview.htm, Jul. 20, 1998, 10 pages.
Wiederhold, G., "Database Design, Second Edition," McGraw–Hill, 1983, p. 458.

* cited by examiner

Primary Examiner—Greta Robinson
Assistant Examiner—Susan Rayyan
(74) Attorney, Agent, or Firm—Christensen O'Connor Johnson Kindness PLLC

(57) ABSTRACT

Internal database validation is disclosed. In one embodiment, the system comprises a database having a data table and a validation table. The data table has at least one data column and at least one data row and the validation table has a plurality of validation columns and a validation row. Also included is a database engine module for maintaining the database and a database validation module operative to read a validation value from the validation column of the validation row and using the validation value to validate a data value in the data column of the data row.

15 Claims, 4 Drawing Sheets

INTERNAL DATABASE VALIDATION

CROSS-REFERENCE TO RELATED APPLICATIONS

This application is a continuation of U.S. patent application Ser. No. 09/157,828, filed Sep. 21, 1998 and entitled INTERNAL DATABASE VALIDATION. The subject matter of application Ser. No. 09/157,828 is specifically incorporated herein by reference. This application is also related to the following application, which was filed on the same day and assigned to the same assignee as the parent application: "Use of Relational Databases For Software Installation"—Application Ser. No. 09/158,125, now U.S. Pat. No. 6,237,144.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright © 1998, Microsoft Corporation, All Rights Reserved.

FIELD

This invention relates generally to database applications, and more particularly to internally validating databases.

BACKGROUND

Relational databases are used by many of the software applications currently available. An important aspect in the use of these databases is insuring that the database is valid and contains high quality data.

Database engines typically have mechanisms designed to maintain the validity of the database. One way a typical database engine maintains validity is to insure that the data entered for a column meets the criteria defined by the data type of the column. For example, a database engine will reject a value containing alphabetic characters for a column defined as containing integer.

Another way a database commonly maintains validity is by maintaining what is known in the art as referential integrity. Referential integrity is maintained by ensuring that rows in a target table identified by foreign key values in a source table actually exist. In other words, a source table is not allowed to have foreign key values that refer to a non-existent row in a target table.

While the mechanisms discussed above are a step towards maintaining quality data in the database, several problems remain. First, it is commonly the case that the data in the database must meet application specific criteria. For example, certain columns typically must contain values that are within a minimum and maximum range relevant to the software application. While the data type specified for a column will generally have a minimum and maximum value, this value is typically determined by the data structure used to represent the value, and is the same for all applications using the database engine. There is typically no way to specify an application specific range for a column.

Second, it is common for the valid values for a column to belong to a relatively limited set, or for the values to be excluded from a set. There is generally no way for a database engine to validate a column against a set of values.

Third, many times a column contains data having a specific syntax, such as a file name, version number or system identifier. Because the column must be specified using one of the native data types supported by the database engine, there is no way for the engine to provide syntax specific validation.

Fourth, referential integrity checks are typically performed when a row is being inserted, updated or deleted. The foreign keys in the source row must refer to a currently existing target row in the database. However, the check is made when the database operation is performed. Typically, there is no way to validate the row prior to the operation to give the user a chance to correct the data.

Finally, the validation performed by a database engine occurs when the user attempts to insert a row into the database. The row as a whole must be valid, there is no way for the user to find and correct individual data values for columns having an invalid value before inserting or updating the row.

Thus there is a need for a database validation system that provides for a more flexible range checking mechanism and that provides for validating a value against a set of values. The system should also provide for validating columns containing data having a common syntax, such as a file name, version number or system identifier. In addition, the system should be able to validate individual columns of a candidate row before the row is inserted, updated or deleted in the database. Finally, the system should provide for easy modification of the validation criteria to accommodate changes to table definitions and modifications to the validation criteria itself.

SUMMARY

The above-identified problems, shortcomings and disadvantages with the prior art, as well as other problems, shortcoming and disadvantages, are solved by the present invention, which will be understood by reading and studying the specification and the drawings. One aspect of the invention is a system that comprises a database having a data table and a validation table. The data table has at least one data column and at least one data row and the validation table has a plurality of validation columns and a validation row. Also included is a database engine module for maintaining the database and a database validation module operative to read a validation value from the validation column of the validation row and using the validation value to validate a data value in the data column of the data row.

A further aspect of the invention is a validation table contains columns used to provide validation constraints applied to column data contained in rows of data tables in the database. The constraints include range bounds, set membership, and foreign key relationship checks. The tables and columns to be validated are specified within the validation table.

As part of the invention, validation methods are executed by a validation module contained within the database engine maintaining the database. In an alternative embodiment, the validation module is a separate component.

The invention provides advantages not found in prior systems. Validation parameters are easy to maintain because they reside in a table that can be edited. Changes and additions to the validation parameters do not require altering the database table definition or other database system parameters, thereby avoiding. the possibility of having to rebuild and repopulate the entire database. Validation parameters can be added easily as new tables and columns are added to the database.

The methods of the invention allow for checking individual columns within a row, the whole row, and the whole row against the database. Also, the methods associated with the invention can check for referential integrity prior to the insertion, modification or deletion of a row.

The invention includes systems, methods, computers, and computer-readable media of varying scope. Besides the embodiments, advantages and aspects of the invention described here, the invention also includes other embodiments, advantages and aspects, as will become apparent by reading and studying the drawings and the following description.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system of one embodiment of the invention is presented. In the third section, a method, in accordance with an embodiment of the invention, is provided. Finally, in the fourth section, a conclusion of the detailed description is provided.

Hardware and Operating Environment

Figure 1:
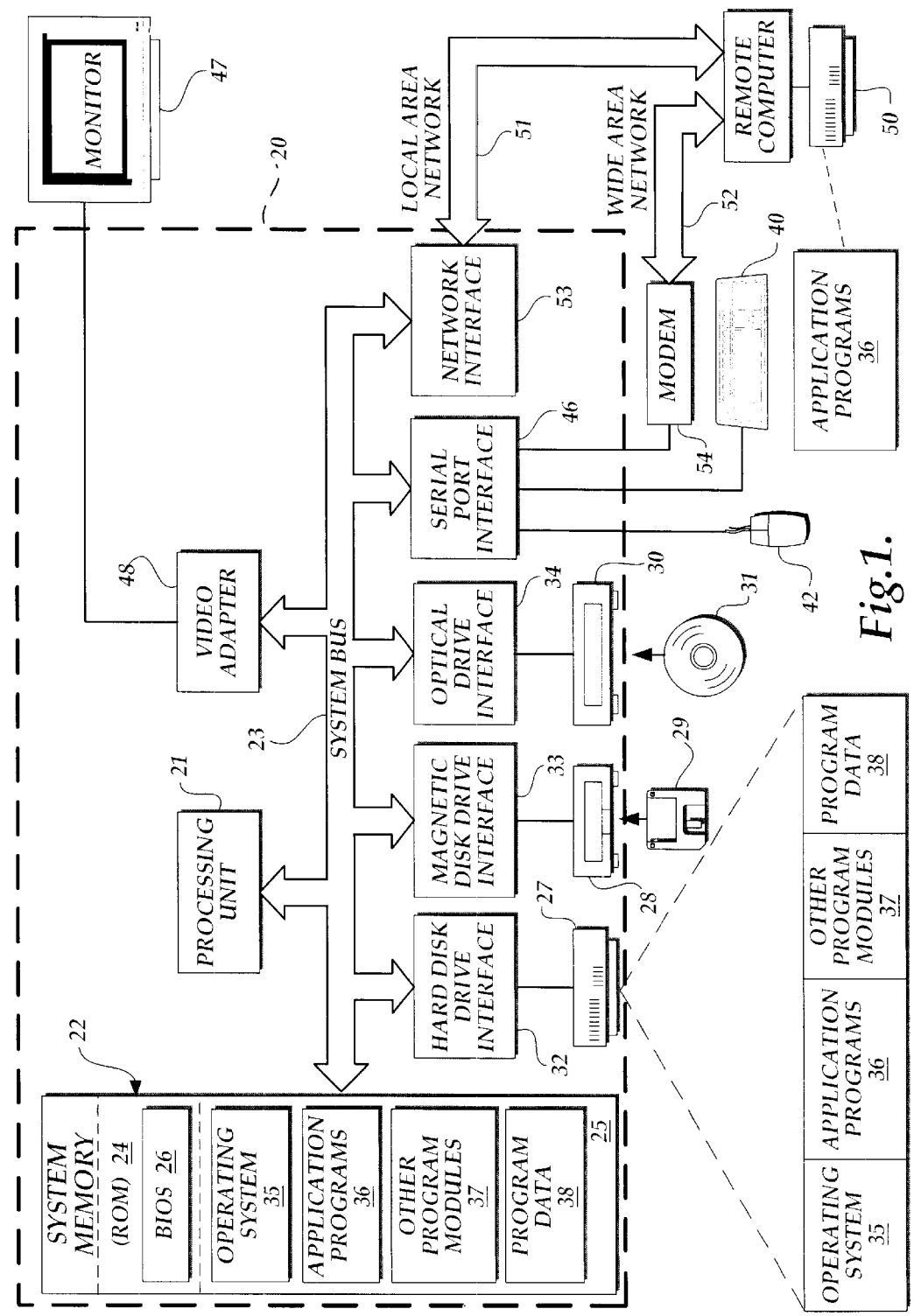
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other-input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory, storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System

Figure 2A:
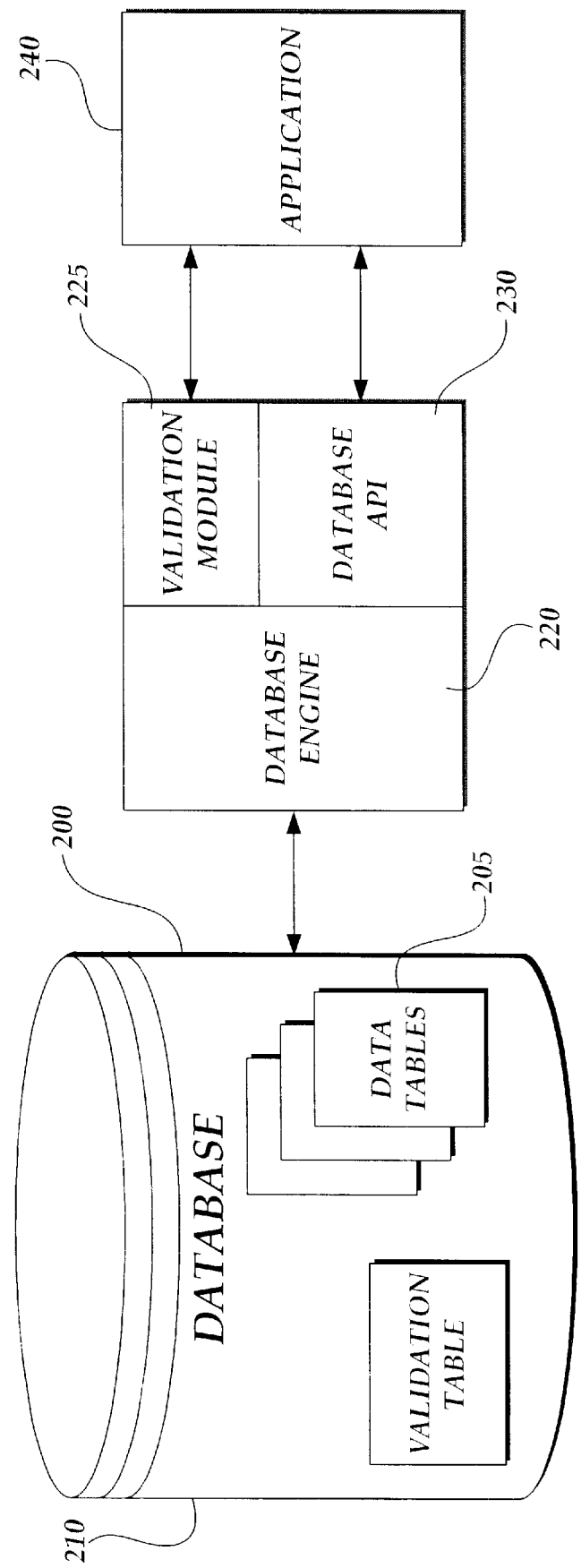
FIG. 2(a) shows a block diagram of a system according to one embodiment of the invention.

In this section of the detailed description, a description of a computerized system according to an embodiment of the invention is provided. The description is provided by reference to FIG. 2(a), a block diagram of a system of an embodiment of the invention and FIG. 2(b), a description of a database table. In FIG. 2(a), a system according to an embodiment of the invention includes database engine 220, validation-module 225, database Application Program Interface (API) 230, and database 200 having data rows 205 and validation table 210.

Database 200 is a conventional relational database. Database 200 contains a plurality of data tables 205 and a validation table 210. Each of data tables 205 has one or more columns having a defined data type such as integer, real, string, or binary data. These tables are typically used to hold application specific data. In one embodiment of the invention, database 200 is a database containing software application installation data such as file names, directory names, registry keys and identifiers. Validation table 210 also has a set of columns, these columns will be described in detail below.

Database engine 220 is a computer program responsible for maintaining database 200. Database engine 220 is an interface between client applications and the database 200. Database engine 220 performs various operations such as reading data from the database in response to application program queries, writing data to the database when an application program inserts, deletes, or updates a row in the database. In addition, database engine 220 commonly maintains indexes associated with tables in the database.

Database API 230 is an application program interface used by a database client application such as application 240. The API defines the interface between a database client and the database engine 220. Typically, database API 230 is a set of function calls allowing a database client to create a database table; insert, update and delete rows within a table; query for rows in a table meeting certain criteria; and read data from rows in a table.

Validation module 225 is a computer program module comprising computer instructions to execute the method described below with reference to FIG. 3. Validation module 225 provides an API to allow client applications such as application 240 to invoke the methods implemented by validation module 225. These methods provide for validating data in an individual column within a row, and for validating an entire row against the whole database. Validation module uses the data in validation table 210 in conjunction with the method described below to validate data in data tables 205. It is desirable that validation module 225 is included as a module of database engine 220. This allows validation module 225 quicker and more efficient access to the data in both data tables 205 and validation tables 210. However, the invention is not so limited, validation module 225 could be part of another component or library included in an application, or even a standalone component or application.

Application 240 is a database client application requiring the services provided by the database engine 220 and validation module 225. In one embodiment of the invention, application 240 is a software installation application designed to provide a robust and easy to use interface for installing software applications from an installation medium to a user's computer system.

Figure 2B:
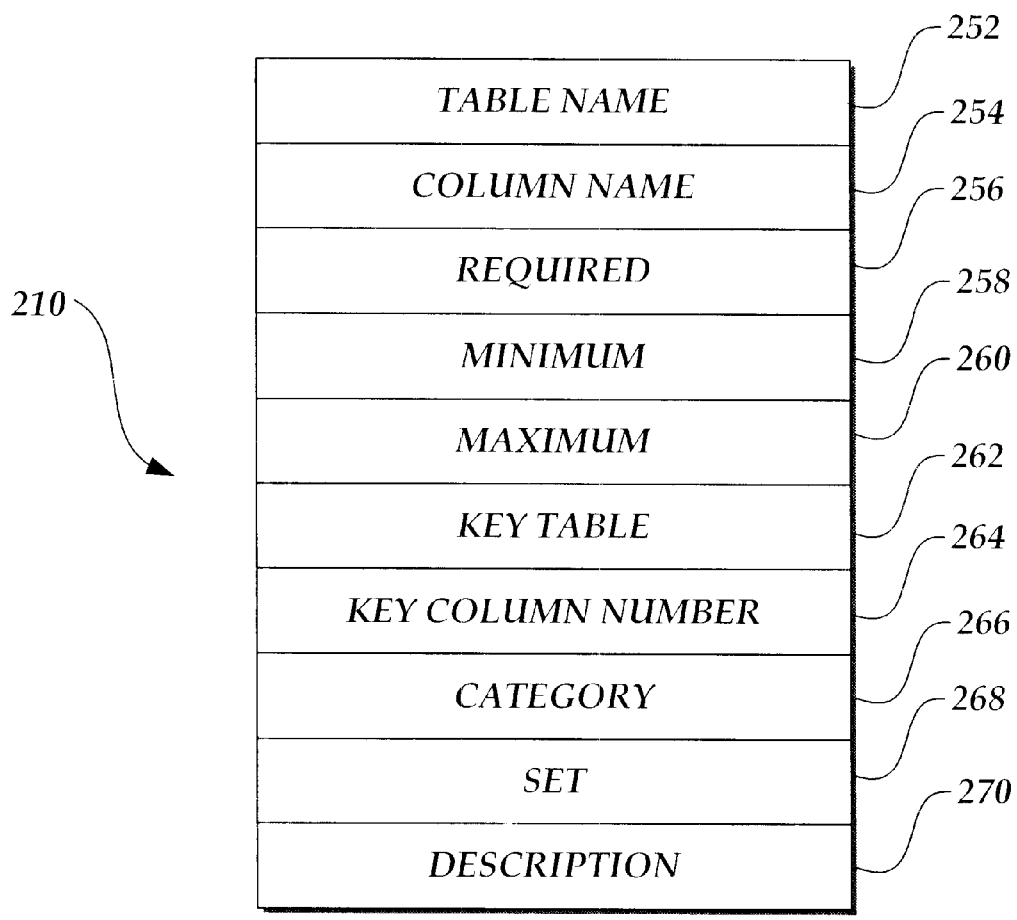
FIG. 2(b) shows a database table definition used by a system according to one embodiment of the invention.

In FIG. 2(b), a detailed description of validation table 210 is provided. Validation table 210 comprises a set of columns specifying how a column within a table is to be validated. In one embodiment of the invention, validation table 210 includes the following columns: table name 252, column name 254, required 256, minimum 258, maximum 260, key table 262, key column number 264, category 266, set 268 and description 270. Further information describing each of these columns is provided below.

Table name 252 and column name 254 identify a single column to be validated using the validation data contained in the remaining columns of the row. Table name 252 identifies a table name within database 200, and column name 254 identifies the name of a column within that table. For efficiency reasons, it is desirable that table name 252 and column name 254 are keys into validation table 210.

Required 256 is a column that indicates whether or not a non-null value is required for the column. Conventional databases allow for columns to have what is known as a null value to indicate that a specific value for the column has not been supplied. Typically, a database designer will specify whether or not the column should allow null values when the table is created. If a null value is not allowed, an application must supply a specific value for the column whenever a new row is entered. However, it is common for the database to allow nulls by default unless the designer specifies otherwise. The required field allows a user, for validation purposes, to override a database table definition allowing null values to make a specific value a requirement for the column, regardless of whether or not the database itself would require a value.

Minimum 258 and maximum 260 are used individually or together to define the minimum and maximum values for the column. When used together, minimum 258 and maximum 260 define a range of valid values for the column.

Key table 262 and key column number 264 together serve as a primary key identifier and are used together to indicate that there is a foreign key relationship between the tables specified by table name 252 and key table 262. The key values in key table 262 are indicated by key column number 264. It is desirable for database efficiency reasons that columns comprising keys in a table be specified first in the table. Thus, key column number indicates the number of columns in key table 262 that are used as primary keys, starting with the first column defined in the table specified by key table 262. For example, a value of "2" in key column number 264 indicates that the first two columns of the table named in key table 262 are the primary keys for the table.

While the above described mechanism is desirable, other alternatives are possible and within the scope of the invention. For example, in one alternative embodiment, a column in validation table 210 is used to specify the names of the columns in the table identified by key table 262 used in a foreign key relationship. In another alternative embodiment, a column holding a bitmap is used to identify the columns used in a foreign key relationship.

Category 266 is used to specify a particular type of validation to be performed on the column specified by table name 252 and column name 254. In one embodiment of the invention, category 266 is an enumerated data type, with specific values indicating the type of validation. Typically, these validations are performed on columns having a native database type of a character string. Different types of validation include, but are not limited to, file name validation, uppercase and lowercase validation, version number validation and GUID (Globally Unique Identifier) validation.

File name validation checks to make sure that the string value in the identified column meets the syntax for a file name as established by the operating system.

Uppercase and lowercase validation checks to make sure the string in the identified column is comprised entirely of characters in the specified case.

Version number validation checks to make sure the string in the identified column meets the syntax specified for version numbers, typically a dotted number format (e.g. "1.2.4.1").

A GUID is an identifier maintained by the operating system and is used to assign a unique identifier to particular objects used by the operating system. GUID validation checks to make sure that the string value in the identified column is a valid GUID.

The above-described categories are not meant to be an exhaustive list, and those skilled in the art will recognize that many other categories are possible and within the scope of the invention.

Set 268 is a column used to specify a set of values that either comprise a set of valid values, or a set of invalid values. Set 268 can be used either alone or in conjunction with minimum 258 and maximum 260 to provide a range of values in addition to a set of. values, or to exclude a set from a range of valid values. In one embodiment of the invention, set 268 is what is known in the art as a multi-value column, in other words, a single column capable of holding a plurality of values defining the set.

In an embodiment of the invention, a description 270 column is provided. Description 270 provides a textual description of the validation performed. The text can be used by applications desiring to provide information to a user regarding the particular validation. For example, text in description 270 could be used in an error message explaining why a particular column value failed to validate, or the text could be used in an editing tool to indicate the validation to be performed as a user modifies data in the data tables of the database or the validation table.

Method

In this section of the detailed description, a method according to an embodiment of the invention is presented. This description is provided in reference to FIG. 3. The computerized method is desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer. Thus, in one embodiment, a computer program module is executed by a processor of a computer from a medium therefrom to internally validate one or more columns in one or more rows of a database.

Figure 3:
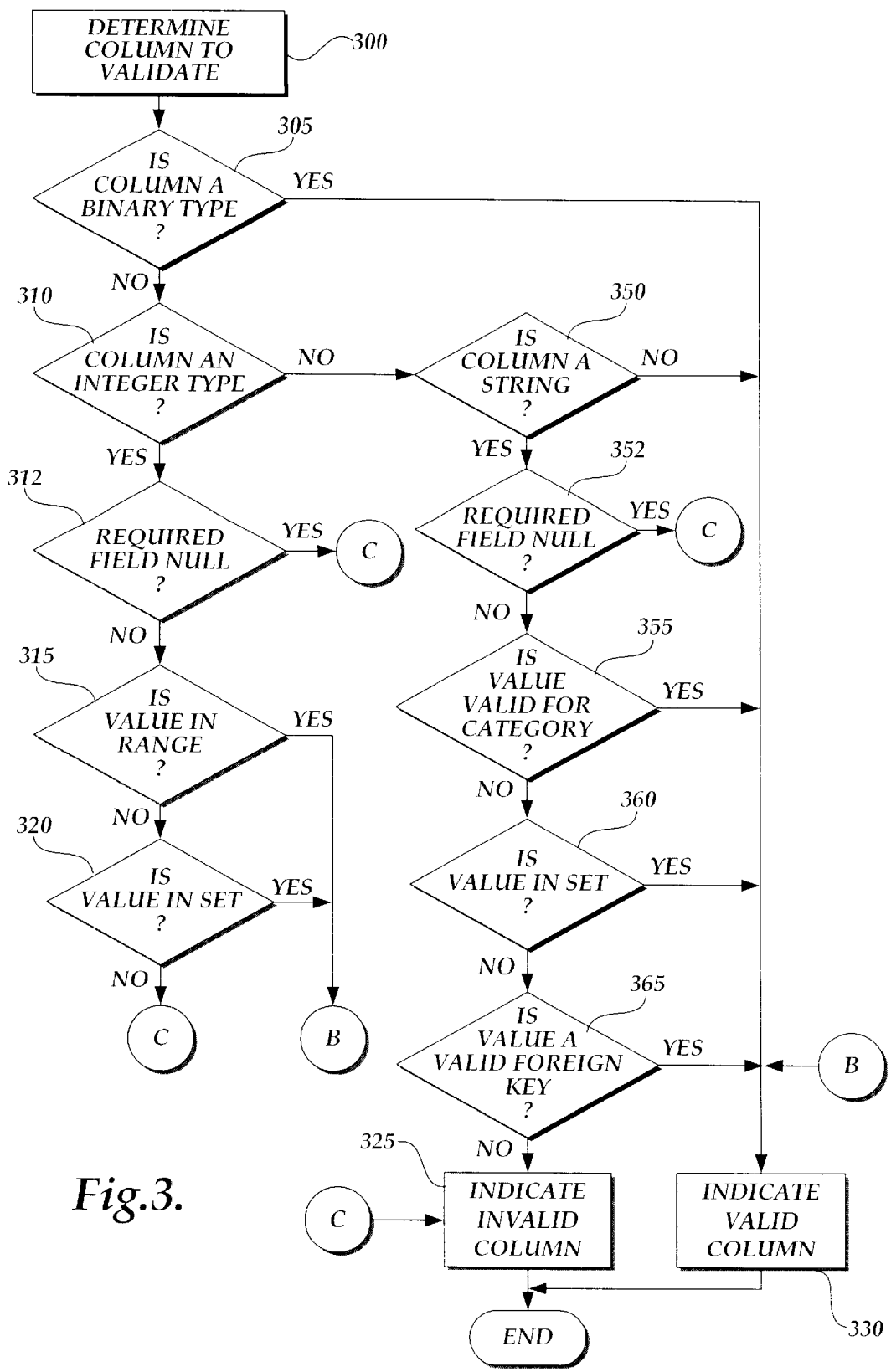
FIG. 3 shows a flowchart illustrating a method according to one embodiment of the invention.

In FIG. 3, a flowchart of a method according to one embodiment of the invention is shown. In one embodiment of the invention, the method is invoked by a call to a function named "MSIViewModify". The signature for the function comprises the function name, and a number of parameters:

MSIViewModify(hView, enum, hRec).

The hView parameter is a handle to what is known in the art as a database view. The view defines the columns to be validated.

The hRec parameter is a handle to a row containing column values to be inserted, updated, or deleted.

The enum parameter is an enumerated data type indicating the type of validation to be performed. In one embodiment of the invention, four validation types exist: "validate", "validateField", "validateNew", and "validateDelete".

The "validate" enum validates columns in the view. A "validateField" enum validates a particular column.

The "validateNew" enum validates the columns in the database view, and in addition checks to see if the addition of the new record referred to by the hRec parameter would result in a duplicate primary key.

The "validateDelete" enum checks for external references to the data values in the columns specified by the hView parameter of the record referenced by the hRec parameter. This enum ensures that the deletion of a database row does not break the referential integrity of the database that would be caused by removing a row that is referenced by a foreign key in a row in a table of the database.

A method of one embodiment of the invention will now be described. The method begins at 300 by determining a column to validate. In one embodiment of the invention, the determination of a column is driven by the input parameters to a function call, for example the MSIViewModify function discussed above. Once a column to validate has been identified, the validation table 210 is read from the database using the table name and column name as keys to retrieve validation data for the column. Also, the data type of the column must be determined in order to perform the correct validation checks.

At 305, the method checks to see if the column data type is a binary image type, also known in the art as a BLOB (binary large object) type. In one embodiment of the invention, validation is not performed on binary image data types, and therefor the method indicates that the column validated successfully. Those skilled in the art will recognize that certain validations could be performed on binary objects. For example, the binary image could be validated using a checksum.

At 310, the method checks to see if the column data is a numeric data type. Included in numeric data types are integers, floating point numbers and fixed point decimal numbers. If the column data type is a numeric type, the method proceeds to 312, where the method uses required column 256 (FIG. 2) to determine if a data valued for the column is required. Columns having required data values are not allowed to have null as a value. If a data value for the column is required and the current value for the column is null, the method proceeds to 325 to indicate that the column data is invalid.

If the column data passes the check at 312, the method proceeds to 315, where the method checks the numeric data to see if it is in a range defined by minimum 258 and maximum 260 columns of validation table 210 (FIG. 2). If the numeric data is within the prescribed range, the method proceeds to 330, to indicate that the column data is valid.

If the column data fails the check at 315, the method next checks to see if the column data value is contained in a set defined by set 268 of validation table 210. If the value is in the set, the method proceeds to 330, which indicates that the column is valid. If not, the method proceeds to 325, which indicates that the column is invalid, thereby ending the validation performed for numeric data types.

In an alternative embodiment (not shown), set 268 indicates a set of invalid values. In addition, if a range is defined by minimum 258 and maximum 260, the set will define values to be excluded from the range. In this embodiment the order of the checks made at 320 and 315 are reversed and the indication of valid and invalid for 320 is reversed. For example, the method proceeds from step 312 as described above to 320, which checks to see if the value is in the set. If it is, the method proceeds to 325 to mark the column as invalid. Otherwise, the method proceeds to 315, which performs the range check as described above, with the difference that if a value is not in the range, the method proceeds to 325 to mark the column invalid, rather than proceeding to 320 (which in this embodiment has already been executed as described above).

If the check at 310 determines that the column data type was not numeric, the method proceeds to 350, where a check is made to see if the column data type is a string type, including both fixed length and variable length strings types. If the data type is not a string type, the method proceeds to 330 to mark the column as valid. If the column data type is a string type, then the method proceeds to 352, where a check similar to that made at 312 is performed to see if a data value for the column is required and if the column data is null. If a data value for the column is required and the column data is null, then the method proceeds to 325 to mark the column as invalid.

If the check at 352 succeeds, the method proceeds to 355, which checks the column data to make sure it is valid for the category specified in category 266 of validation table 210 (FIG. 2). If the category is a file name category, the method checks to make sure the column data is a string conforming to the syntax for a valid file name. If the category is an identifier category, the method checks to make sure the identifier has a valid identifier syntax. In one embodiment of the invention, the identifier is a GUID (Globally Unique IDentifier) and the method checks to make sure the GUID exists. If the category is an uppercase or lowercase category, the method checks to make sure all the characters of the string are the specified case. If the column data is valid for the category, the method proceeds to 330 to mark the column as a valid column.

If the check at 355 determines the column data is not valid for the category, the method then proceeds to 360, which checks to see if the column data is a member of the set defined by set column 268 of validation table 210. If so, the method proceeds to 330 to mark the column as valid, otherwise the method proceeds to 365.

At 365, the method checks to see if the column data is a foreign key value referring to the table and column specified by key table 262 and key column number 264 of validation table 210. If the column data value is a valid foreign key value, the column is marked as valid, otherwise the column is marked as invalid, thereby ending the validation checking for string data types.

Conclusion

An internal database validation system has been described. Although specific embodiments have been illustrated and described herein, it will be appreciated by those of ordinary skill in the art that any arrangement which is calculated to achieve the same purpose may be substituted for the specific embodiments shown. For example, the database validation module could reside in components other than the database engine. In addition, the invention has been described in terms of a relational database, however the invention could also be used within an object oriented database environment or other non-relational database. Also, the specification has described validation performed on numeric and string data types, however other data types can be supported by the methods and data structures described in the specification. This application is intended to cover any adaptations or variations of the present invention. Therefore, it is manifestly intended that this invention be limited only by the following claims and equivalents thereof.

We claim:

1. A computerized internal database validation system comprising:

a database engine module for maintaining a database, said database having a data table and a validation table, said data table having a data column and a data row, said validation table having a plurality of validation columns and a validation row, wherein said validation columns include a column specifying application-specific validation criteria for the data column and wherein all applications using the data column are not required to satisfy said validation criteria; and a database validation module operative to receive a request from an application to validate the data column and, in response to receiving said request, read a validation value from a validation column of the validation row and use the validation value to validate a data value in the data column of the data row, said database validation module forming a module included within the database engine module.

2. The system of claim 1, wherein the validation columns includes a column specifying a minimum value for the data column.

3. The system of claim 1, wherein the validation columns include a column specifying a maximum value for the data column.

4. The system of claim 1, wherein the validation columns include a column specifying a set of valid values for the data column.

5. The system of claim 1, wherein the validation columns includes a column specifying a key column from the data table.

6. The system of claim 1 further comprising a software application installation editing tool operative to modify the data in the database and wherein the database contains a set of software application installation data.

7. A method of internally validating a database comprising:

determining a column to validate;

reading a validation row from a validation table in the database, said validation table including a table name column, a column name column, and a key identifier column;

identifying a data column in a candidate row using the table name column and the column name column; and determining if the data column in the candidate row refers to a data row of the database identified by the key identifier column prior to a database operation on the column to validate.

8. A computer comprising:

a processor;

a computer-readable medium;

a database having a data table and a validation table, said data table having a data column and a data row, said validation table having a plurality of validation columns and a validation row, wherein said validation columns include a column specifying application-specific validation criteria for the data column and wherein all applications using the data column are not required to satisfy said validation criteria;

a database engine module for maintaining the database; and a database validation module operative to receive a request from an application to validate the data column and, in response to receiving said request, read a validation value from a validation column of the validation row and use the validation value to validate a data value in the data column of the data row, wherein the database validation module is a module contained within the database engine module.

9. A computer-readable medium having computer-executable instructions for performing a method comprising:

determining a column to validate;

reading a validation row from a validation table in the database, said validation table including a table name column, a column name column, and a key identifier column;

identifying a data column in a candidate row using the table name column and the column name column; and determining if the data column in the candidate row refers to a data row of the database identified by the key identifier column prior to a database operation on the column to validate.

10. A method of internally validating a database comprising:

determining a column to validate;

reading a validation row from a validation table, said validation table including a table name column, a column name column, a column category column, and a valid value column;

identifying a data column in a candidate row using the table name column and the column name column;

performing a validation of a data value in the data column prior to a database operation on the column to validate; and setting a results indicator based on the validation comparison.

11. The method of claim 10, wherein the validation table further includes a maximum value column and wherein performing a validation of a data value in the data column includes comparing the data value to a value from the maximum value column in the validation row.

12. The method of claim 10, wherein the validation table further includes a minimum value column and wherein performing a validation of a data value in the data column includes comparing the data value to a value from the minimum value column in the validation row.

13. The method of claim 10, wherein the validation table further includes a set column defining valid values and wherein performing a validation of a data value in the data column includes comparing the data value to each value from the set column in the validation row.

14. The method of claim 10, wherein the validation table further includes a set column defining invalid values and wherein performing a validation of a data value in the data column includes comparing the data value to each value from the set column in the validation row.

15. The method of claim 10, wherein the validation table includes a category column and wherein performing a validation of a data value includes determining that the data value conforms to a syntax specified by a data item in the category column.

* * * * *

UNITED STATES PATENT AND TRADEMARK OFFICE
CERTIFICATE OF CORRECTION

PATENT NO.    : 6,560,598 B2
DATED         : May 6, 2003
INVENTOR(S)   : J.C. Delo et al.

It is certified that error appears in the above-identified patent and that said Letters Patent is hereby corrected as shown below:

Column 1,
Line 24, "drawing" should read -- drawings --
Line 44, "integer." should read -- integers. --

Column 2,
Line 16, "invalid, there" should read -- invalid; there --
Line 20, "Thus" should read -- Thus, --
Line 48, "validation table" should read -- validation table that --
Line 64, "avoiding. the" should read -- avoiding the --

Column 3,
Line 30, "which is" should read -- which are --

Column 4,
Line 2, "PCS," should read -- PCs, --
Line 14, "components include" should read -- components including --
Line 35, "CD ROM" should read -- CD-ROM --
Line 58, "other-input" should read -- other input --

Column 5,
Line 8, "device or" should read -- device, or --
Line 30, "memory, storage" should read -- memory storage --
Line 51, "invention and" should read -- invention, and --
Line 66, "columns, these" should read -- columns; these --

Column 6,
Line 6, "queries, writing" should read -- queries, and writing --
Line 26, "module uses" should read -- module 225 uses --
Line 32, "not so limited," should read -- not so limited; --
Line 34, "standalone" should read -- stand-alone --

Column 7,
Line 52, "(e.g." should read -- (e.g., --

UNITED STATES PATENT AND TRADEMARK OFFICE
CERTIFICATE OF CORRECTION

PATENT NO. : 6,560,598 B2
DATED : May 6, 2003
INVENTOR(S) : J.C. Delo et al.

It is certified that error appears in the above-identified patent and that said Letters Patent is hereby corrected as shown below:

<u>Column 8,</u>
Line 1, "of. values" should read -- of values --
Line 67, "for example" should read -- for example, --

<u>Column 9,</u>
Line 11, "therefor" should read -- therefore --
Line 22, "data valued" should read -- data value --
Line 45, "are reversed" should read -- is reversed --
Line 59, "strings types." should read -- string types. --

<u>Column 10,</u>
Line 20, "valid," should read -- valid; --
Line 21, "otherwise" should read -- otherwise, --
Line 26, "valid, otherwise" should read -- valid; otherwise, --
Line 40, "database, however" should read -- database; however, --
Line 44, "types, however" should read -- types; however, --

<u>Column 11,</u>
Line 4, "includes" should read -- include --
Line 13, "includes" should read -- include --
Line 15, "claim 1" should read -- claim 1, --

Signed and Sealed this

Thirtieth Day of September, 2003

JAMES E. ROGAN
*Director of the United States Patent and Trademark Office*